(12) United States Patent
Hintzy

(10) Patent No.: US 6,671,600 B1
(45) Date of Patent: Dec. 30, 2003

(54) PRODUCTION METHOD USING GLOBAL POSITIONING SYSTEM

(75) Inventor: Gaëtan Hintzy, Paris (FR)

(73) Assignee: GTM Construction, Nanterre (FR)

( * ) Notice: Subject to any disclaimer, the term of this patent is extended or adjusted under 35 U.S.C. 154(b) by 0 days.

(21) Appl. No.: 09/913,777

(22) PCT Filed: Feb. 11, 2000

(86) PCT No.: PCT/FR00/00344
§ 371 (c)(1),
(2), (4) Date: Mar. 25, 2002

(87) PCT Pub. No.: WO00/48048
PCT Pub. Date: Aug. 17, 2000

(30) Foreign Application Priority Data

Feb. 12, 1999 (FR) .............................................. 99 01737

(51) Int. Cl.$^7$ ............................. G06F 19/00; G01S 3/02
(52) U.S. Cl. ......................... 701/50; 701/207; 340/988; 367/69; 342/357
(58) Field of Search .................... 701/50, 208, 300, 701/211, 101, 102, 104, 207, 213, 214; 340/988; 367/69; 342/357

(56) References Cited

U.S. PATENT DOCUMENTS

| | | | | |
|---|---|---|---|---|
| 5,493,494 A | * | 2/1996 | Henderson | 342/357 |
| 5,631,658 A | | 5/1997 | Gudat et al. | 342/457 |
| 5,646,844 A | * | 7/1997 | Gudat et al. | 701/208 |
| 5,838,562 A | | 11/1998 | Gudat et al. | 364/424.02 |
| 5,935,192 A | * | 8/1999 | Henderson et al. | 701/208 |
| 5,987,371 A | * | 11/1999 | Bailey et al. | 701/50 |
| 6,128,574 A | | 10/2000 | Diekhans | 701/209 |

FOREIGN PATENT DOCUMENTS

| | | | | |
|---|---|---|---|---|
| EP | 0 821 296 A2 | 1/1998 | | G05D/1/02 |
| WO | WO 98/09207 | 3/1998 | | G05D/1/03 |

* cited by examiner

Primary Examiner—Thomas G. Black
Assistant Examiner—Tuan C To
(74) Attorney, Agent, or Firm—Nawrocki, Rooney & Sivertson, P.A.

(57) ABSTRACT

A method of producing a projected useful form from an existing body delimited by a three-dimensional envelope using a tool mounted on a machine cooperating with a global satellite positioning system of the bifrequency, differential, kinematic and real time type such as GPS, the machine having at least one global positioning receiver in order to be moved according to a theoretical model of the form, is provided.

47 Claims, 5 Drawing Sheets

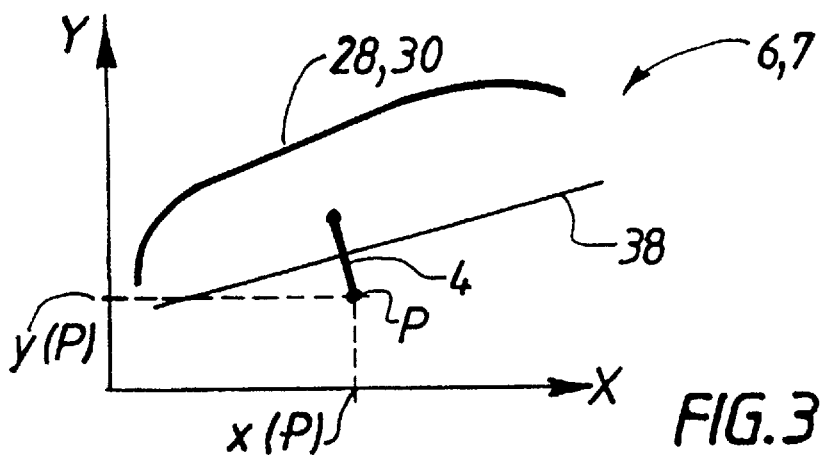
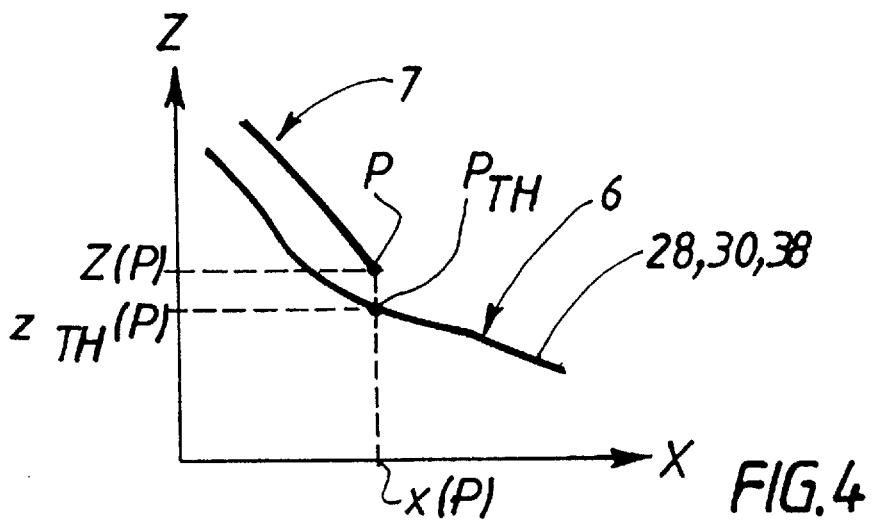
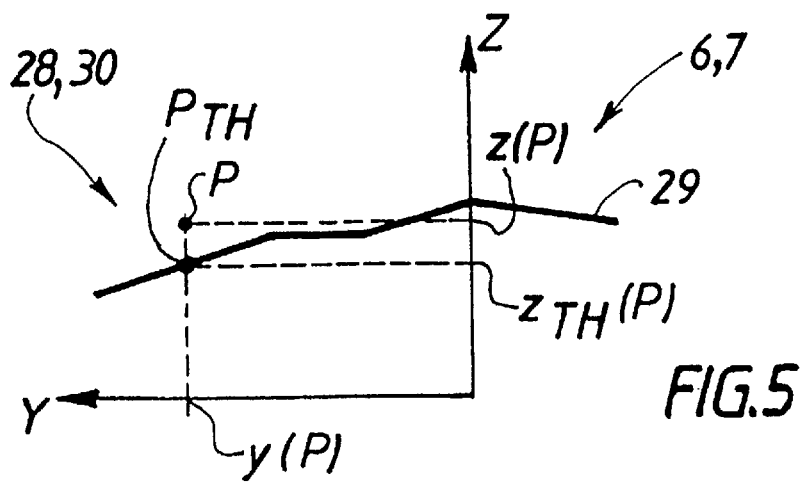

PRODUCTION METHOD USING GLOBAL POSITIONING SYSTEM

TECHNICAL FIELD

The present invention relates generally to a method of producing a useful form according to a theoretical model, more particularly a projected useful form from an existing body delimited by a three-dimensional envelope using a tool mounted on a machine cooperating with a global satellite positioning system of the bifrequency, differential, kinematic and real time type such as GPS, the machine having at least one global positioning receiver in order to be moved according to a theoretical model of the form.

BACKGROUND OF THE INVENTION

The purpose is to produce a useful form with at least one surface, defined by the movement along an arch axis of another transverse curve, in general polygonal, possibly variable. Such a surface is referred to as a topographical profile. Such a profile must be as close as possible to a projected theoretical profile referred to as a model.

This model, for example defined by means of computer aided construction software, represents the useful form to be produced. In practice, these useful forms have faults or imperfections compared with the model, which it is necessary to remove in order to ensure that this form meets the requirements. Thus, in order to evaluate the quality of evenness of road projects, a notation system has been set up.

These defects are detected by physical measurement in situ and quantified from a numerical analysis of the unevennesses along the profile of the roadway, by physical measuring appliances. The magnitude of these defects is between a few millimetres for the smallest, and a few tens of millimetres for the largest. According to the magnitude measured, a grade known as the LPA (Longitudinal Profile Analysis) grade lying between 0 and 10 is attributed to the useful form. The grade 0 is then attributed to a useful form whose defects have a magnitude of a few tens of millimetres. For defects whose magnitude does not exceed a few millimetres, the grade 10 is attributed to the useful form.

To produce such useful forms in practice, three techniques are normally employed. One technique consists of guiding at least one site machine along wires installed on site. These wires give physical expression to the arch axis which the machine must travel along. In practice, wire guidance does not make it possible to produce useful forms having one or more complex surfaces as easily and rapidly as simple useful forms. This is because only two dimensions in space are apprehended, and the notation of the useful road forms thus obtained does not in general exceed 6.

Another technique consists of guiding site machines along laser beams, which give physical expression to the arch axis, formed by one or more straight sections, which the machines have to travel along in order to produce the useful form. The successive positionings of the machine are obtained from its initial position, considering that it follows the arch axis, by measuring the distance travelled from the origin, calculating, by means of the laser, an actual position of the machine with respect to the curve, and attempting to make this position coincide with the required curve. When useful forms are produced having one or more complex surfaces, this guidance requires frequent repositioning of the lasers.

In addition, because of the optical nature of the laser, it is essential to avoid the interposing of physical obstacles between an optical source and its receiver. However, such obstacles, such as other machines on the site (compacter, bulldozer, lorries, earth movers or the like) frequently cut the laser beam, requiring interruption of the operation or production guided by the laser.

In addition, geometric variations within certain useful forms complicate or even prevent the use of laser guidance: interchange roads can for example be cited.

Finally, the use of a laser is complex or even possible for useful forms whose arch axis has small radii of curvature, such as in road interchanges.

Yet another known technique consists of using GPS systems. The document U.S. Pat. No. 5,631,658 can thus be cited, which describes a machine guidance method, for an earthwork machine for example, by means of a GPS system. This document makes provision for storing a first three-dimensional model representing the required geography of a site, and a second three-dimensional model representing the actual geography of this site as it is produced. The two models are compared with means which represent, in digital signals and in real time, the instantaneous three-dimensional position of the machine whilst it is travelling on the site. Other means determine and update the difference between the two geographical models, in real time. Whilst the means control the machine, according to this difference.

One drawback of this method is that it requires computer storage and processing means capable of taking the two three-dimensional models into consideration, which turns out to be complex to implement in practice. In addition, in the useful forms having several juxtaposed surfaces, it is difficult in practice to obtain precise connections between these surfaces, with the known GPS guidance systems. Also, the known GPS guidance systems do not make it possible to work indifferently in one direction or in the other along the arch axis, which requires a certain amount of rigidity in the working method.

The invention therefore aims to permit the production of useful forms, dispensing with the drawbacks mentioned above, amongst others.

One aim of the invention is thus to permit the production of useful forms for road projects, whose LPA notation is greater than 8, preferably equal to 10, with a precision in terms of elevation of ±13 mm. To this end, a first object of the invention is a method of producing a projected useful form such as a road project surface, from an existing body delimited by a three-dimensional envelope, such as a construction site, building or the like, using a tool mounted on a machine, for example an earthwork machine for a site or similar. This machine cooperates with a global positioning by satellite system of the dual-frequency, differential and kinematic type and in real time, such as GPS; and has at least one global positioning receiver, for example on a tool, in order to be moved according to a theoretical model of the useful form.

According to one characteristic, this method includes the steps making provision for:
- storing fixed geometric curves peculiar to the useful form, including at least one substantially longitudinal arch axis and at least one cross-sectional profile;
- measuring, at at least one moment, the elevation, longitudinal and transverse position of the tool, using a global positioning receiver when the tool is moved, for example at a predetermined frequency;
- associating a position along the arch axis with this measured position;

locally calculating the theoretical model whilst making a cross-sectional profile of the useful form correspond to this location;

activating in memory a standard deviation signifying an uncertainty characteristic of the global positioning system, possibly after it is determined during a phase of calibrating the receiver;

comparing, during the movement of the tool, for example at a predetermined frequency, a measured elevation position of the tool with a theoretical altitude defined from the model;

deducing from this comparison a deviation in elevation at the time of measurement, such that this deviation is said to be a zero deviation when the measured elevation position is substantially the same as the theoretical altitude;

defining on the one hand at least from the zero deviation at least two analysis bands, for example two centre bands respectively upper and lower, two median bands respectively upper and lower, and two external bands respectively upper and lower, these bands being for example symmetrical in pairs, lower and/or,upper delimiters of these analysis bands being proportional to the standard deviation;

identifying an active analysis band to which this deviation in elevation belongs;

calculating, according to the deviation and the active analysis band, an elevation slaving reference, a ceiling for whose value is set according to the active analysis band identified; and controlling the elevation position of the tool according to the calculated reference, so that this tool is either momentarily left in position, or brought closer to the model, in a limited fashion, by an elevation distance substantially proportional to the absolute value of the reference.

According to another characteristic, the theoretical model of the useful form is calculated locally from notably at least:

the arch axis, defined mathematically, notably by a line known as the axis in the horizontal plane and by a longitudinal profile, defined themselves by at least one continuous and derivable parameterised function, and including at least part of a geometric curve, and for example a succession of such parts, each being defined mathematically by a simple continuous parameterised function, such as a straight line, arc of a circle, parabola, clothoid or the like; and a cross-profile, defined mathematically by a continuous parameterised function, for example each cross-profile is a succession of end to end straight line segments.

In one embodiment, the method of the invention is also intended for re-establishing a useful form. To this end, the method includes, during the storage of geometric curves, at least one phase making provision notably for a measuring pass of the existing useful form, for example with a machine similar to that provided for effecting the re-establishment.

In addition, the method of the invention provides for a lateral or directional step of controlling the longitudinal path of the machine and/or of the tool during the production of the useful form, this step including the phases making provision for:

defining an auxiliary guidance line-which must be followed by the machine during a given pass of the production, this guidance line being for example at a substantially constant distance from the arch axis;

analysing the measured lateral position in the longitudinal plane of the tool according to the measurements supplied by the receiver; and according to the parameters obtained by this analysis, calculating a lateral slaving control of the machine able to make a trajectory of the machine in the horizontal plane coincide with the auxiliary guidance line.

In addition, on the one hand at least from the zero deviation three analysis bands are provided, namely:

a first analysis band close to the zero deviation, said to be centre and defined by a set of deviations;

a second analysis band, said to be median and defined by deviations greater than those of the centre band; and a third analysis band, further away from the zero deviation than the centre and median bands, said to be external and defined by a set of deviations greater than those of the median band.

SUMMARY OF THE INVENTION

The invention concerns a method of producing a useful form according to a theoretical model, on or from a body delimited by a three-dimensional envelope such as a construction site, a building or the like, using a satellite global positioning system such as GPS or the like. The invention also concerns a control and slaving device implementing the method.

The invention also concerns a machine intended for producing such useful forms.

Finally, it concerns a useful form, for example at least part of a sheet, a deck or volume, a civil engineering edifice, a building or an industrial installation.

By way of example, an application of the invention can be mentioned for carrying out linear road, railway or airport projects, or non-linear projects such as industrial platforms. In such designs, the invention relates to the earthwork operations, and the operations of spreading, nibbling and pouring concrete notably. For these designs or operations, it is frequently necessary to obtain, with a high precision, at least one surface which is at a minimum fine tuned, and possibly complex. Obviously, similar requirements need to be complied with for producing concrete interceptors for roadways cast in situ, edges of pavements, gutters or roadways, and for the burying of pipes, for example petroleum pipelines.

For this purpose, in the example mentioned above, one or more site machines are controlled and/or guided in order to put in a useful form materials such as fill, concrete, bituminous material or similar.

In one embodiment other analysis bands are provided on each side of the model and/or of the zero deviation, for example symmetrical with the centre, median and external bands with respect to the zero deviation. The analysis bands being symmetrical, for example greater and lesser with respect to the zero deviation, the processing of all the deviations considers only their absolute value, the reference corresponding to a deviation of negative sign being equal to the opposite of the reference issuing from the processing of the absolute value of this deviation.

According to another characteristic, the theoretical model is in a position to have the machine running through it along the arch axis and/or along an auxiliary guidance line, freely in one direction or in another direction, for example opposite.

In one embodiment, the method of the invention includes a step of automatic recognition of the direction of movement of the machine along the arch axis and/or the auxiliary guidance line. In addition, at least two successive passes are provided for, for example in elevation, an auxiliary initial guidance line, relating to an initial pass, then being translated in elevation by a predetermined value in order to define a subsequent auxiliary guidance line, relating to a following pass. According to one characteristic, the frequency of measurement, processing and calculation is defined, between a measuring time and a following subsequent measuring time, by a clock in the global positioning system, and is for example around 1 hertz.

In one embodiment, the processing of the deviation according to the method of the invention operates as follows. On the one hand, if the deviation is determined in an external analysis band, then the slaving reference, is of constant value, for example its absolute value corresponds to a tool movement distance of around 10 millimetres. On the other hand, if the deviation is determined in a median analysis band, then there is calculated a so-called median difference or quantity defined by a difference between this deviation and a respective delimiter of this band closest to the zero deviation, a slaving reference being deduced from this quantity. When the absolute value of this quantity is greater than a maximum median action value, then the absolute value of the slaving reference is determined as being substantially equal to this value, for example this value corresponds to a tool movement distance of around 10 millimetres. When the absolute value of this quantity is less than a minimum median action value, then the absolute value of the reference is determined as being substantially equal to this value, for example this value corresponds to a tool movement distance of around 4 millimetres. Whilst when the absolute value of this quantity is between maximum and minimum median values, then the absolute value of the reference is determined as being substantially equal to the absolute value of this quantity.

Finally, if the deviation is determined as being in a centre analysis band, for example upper and lower, then there is effected a step of calculating a so-called centre difference between the absolute value of this deviation and the absolute value of a deviation at a calculation time immediately preceding according to the value of the frequency of processing. When this centre difference is negative or zero, then the reference is chosen so as to be substantially zero, and for example the tool approach elevation distance is zero. When this difference is positive, there is calculated a so-called centre quantity, equal to a fraction of the difference, for example around one third of this difference.

If the centre quantity is greater than a maximum centre value, then the absolute value of the reference is determined as being substantially equal to this value, for example this value corresponds to a tool movement distance of around 4 millimetres. If the centre quantity is less than a minimum centre action value, then the absolute value of the reference is determined as being substantially equal to this value, for example this value corresponds to a tool movement distance of around 1 millimetre. Whereas if the centre quantity is between the minimum and maximum centre action values, then the absolute value of the reference is determined as being substantially equal to this centre quantity.

In one embodiment, there is calculated a regression curve, for example a straight line, which defines the mean change in the deviations deduced during a predetermined interval of time, for example between the times of a prior measurement and a preceding measurement. A regression deviation is extrapolated from this regression curve, and the reference corresponding to the deviation deduced from the difference between a measured elevation position and a theoretical altitude is then corrected according to the difference between this deviation and the extrapolated deviation. The correction applied to the reference makes provision for replacing, in the calculation of this reference, on the one hand the value of the deviation by the value of a corrected deviation, and on the other hand the value of the previous deviation by the value of a previous corrected deviation. The values of the corrected deviation and of the previous corrected deviation are respectively equal to a weighted mean of the value of the deviation and the corresponding extrapolated deviation, and to a weighted mean of the value of the previous deviation and a corresponding previous extrapolated deviation.

According to one characteristic, signals or frames received from the receivers for processing are subjected to decoding and filtering operations, these operations transforming the frames into digital signals able to be processed, and eliminating all the measurements whose deviation with respect to a previous measurement is greater than a predetermined higher value, for example around 100 mm. In addition, a digitisation step is provided by a digitisation module. This digitisation step includes notably the phases of:

digitising data relating to the theoretical model for example issuing from a computer aided design;

simulating the movement of the machine on the theoretical model, in order to check the consistency of the data;

display of parameters of the theoretical model; and creating computer files able to be processed by a computer controlling the method.

In one embodiment, the theoretical model is notably defined by the arch axis and at least one cross-sectional profile, a step being provided of calculation, by linear interpolation between different cross-sectional profile parameters of the theoretical model, successive or continuous along this arch axis. In addition, an automatic step of identification of error in the limited convergence and/or the processing is provided, such as at least one absence of position measurement by the receiver, a lack of communication, an error in digitisation of the theoretical model, an error in transmitting the global positioning information to a computer, an error in calculating slaving, or a positioning error peculiar to the machine.

The method of the invention also provides for the use of at least a second receiver and/or at least one attitude sensor, for example an inclinometer or a camber sensor, and provides three distinct operating modes: a so-called priority mode to the left of the tool, a so-called priority mode to the right of the tool, and a mode without priority, notably for producing broken or similar cross-profiles of the useful form.

A second object of the invention is a control and slaving device intended for producing a theoretical model of a projected form from a body delimited by a three-dimensional envelope, able to implement the method of the invention.

According to one characteristic, this device comprises notably at least:

a positioning module;

a computer able to process information coming from the positioning module and a useful part only of the theoretical model, accessible for example by means of a file;

a digitisation module;

an automatic controller, for example programmable; and elevation distributors respectively right, left and tool direction.

The computer of this device comprises notably at least three sub-systems, namely:
- a decoding and filtering kernel;
- a location kernel; and
- slaving means connected to the elevation and direction control valves of the tool by means of the automatic controller.

According to one characteristic, these decoding, filtering and location kernels contain digital calculation computer programs, applications resulting from digital calculation software or the like. Moreover, the device of the invention comprises means of transmitting to the computer, at any time, information in the form of coded messages, notably relating to a longitudinal, transverse and elevation position of each mobile receiver. In addition, this device has security means, able to detect or identify a stoppage in functioning of the mobile receivers and/or able to cause this device to switch from an automatic functioning mode to a manual functioning mode according to which a driver of the machine entirely controls the latter.

According to one characteristic, this device comprises means of automatically recognising the direction of travel of the machine along the arch axis and/or an auxiliary guidance line of the theoretical model.

A third object of the invention is a machine able to implement the method of the invention and/or containing at least one device of the invention, such as an earthworks bulldozer, a fill tipping skip, a continuous concrete pouring machine, an existing structure nibbler, a snow plough or the like.

According to one characteristic, this machine has at least one tool with at least one global positioning receiver, for example two receivers, mounted on respective masts close to the transverse ends of the tool.

According to another characteristic, this machine has at least one tool with at least one global positioning receiver for example close to the transverse ends of the tool and at least one attitude sensor. In addition, this machine is provided for example with a cab for a driver of this machine, and display means such as a screen, for example liquid crystal or the like.

According to one characteristic, these display means include at least one welcome and parameterising screen, a working screen and a geometric information screen, the welcome and parameterising screen being for example a touch screen to enable a driver of the vehicle to initialise a control and slaving device.

According to another characteristic, the machine of the invention has automatic means of slaving its steering, for example controlled by a control and slaving device of the invention, these steering slaving means being able to automatically make a movement path of the machine converge towards and along an auxiliary guidance line.

In one embodiment, the machine of the invention has means of adjusting the transverse position of the tool about an elevation direction, able to allow the limited convergence of the path of this tool to and along an auxiliary guidance line. In addition, this machine has notably a steering lever and priority determination means for an automatic mode, this determination making it possible, by means of a movement of this lever operated by a driver, to make the functioning of the control and slaving device of the invention pass from an automatic mode to a manual mode.

A fourth object of the invention is a useful form obtained from a body, and produced according to the method of the invention and/or by means of at least one control and slaving device of the invention and/or with at least one site machine of the invention, the differences in level in the useful shape along the arch axis of the theoretical model lying between −13 mm and +13 mm at the most, with respect to the theoretical model, on each side in elevation. The invention is now described in detail,- with reference to the accompanying drawings of embodiments given by way of examples.

BRIEF DESCRIPTION OF THE DRAWINGS

In these drawings:

FIG. 3 is a plan view from above of a theoretical model and a useful form during production by the method of the invention;

FIG. 4 is a view in longitudinal elevation section, of a theoretical model and of a useful form in the course of production by the method of the invention;

FIG. 5 is a view in transverse elevation section, of a theoretical model and of a useful form in the course of production by the method of the invention;

These figures depict a direct orthogonal reference frame XYZ. This reference frame defines three directions in space, with respect to which the invention is described. A so-called longitudinal direction X corresponds here to the usual direction of movement during the production according to the invention. The terms "longitudinally", and "front" and "rear", are defined along this direction X. A front location being opposed longitudinally to a rear location.

Another so-called transverse direction Y makes it possible to define the terms "transversely" or "laterally", as well as "left" and "right" along this direction Y. Here the transverse Y directions are considered as being substantially horizontal, for greater simplicity.

As for a so-called elevation direction Z, this is considered here as being substantially vertical. The terms "high" and "low", as well as "upper" and "lower", are defined in this direction Z.

DETAILED DESCRIPTION OF THE INVENTION

Figure 1:
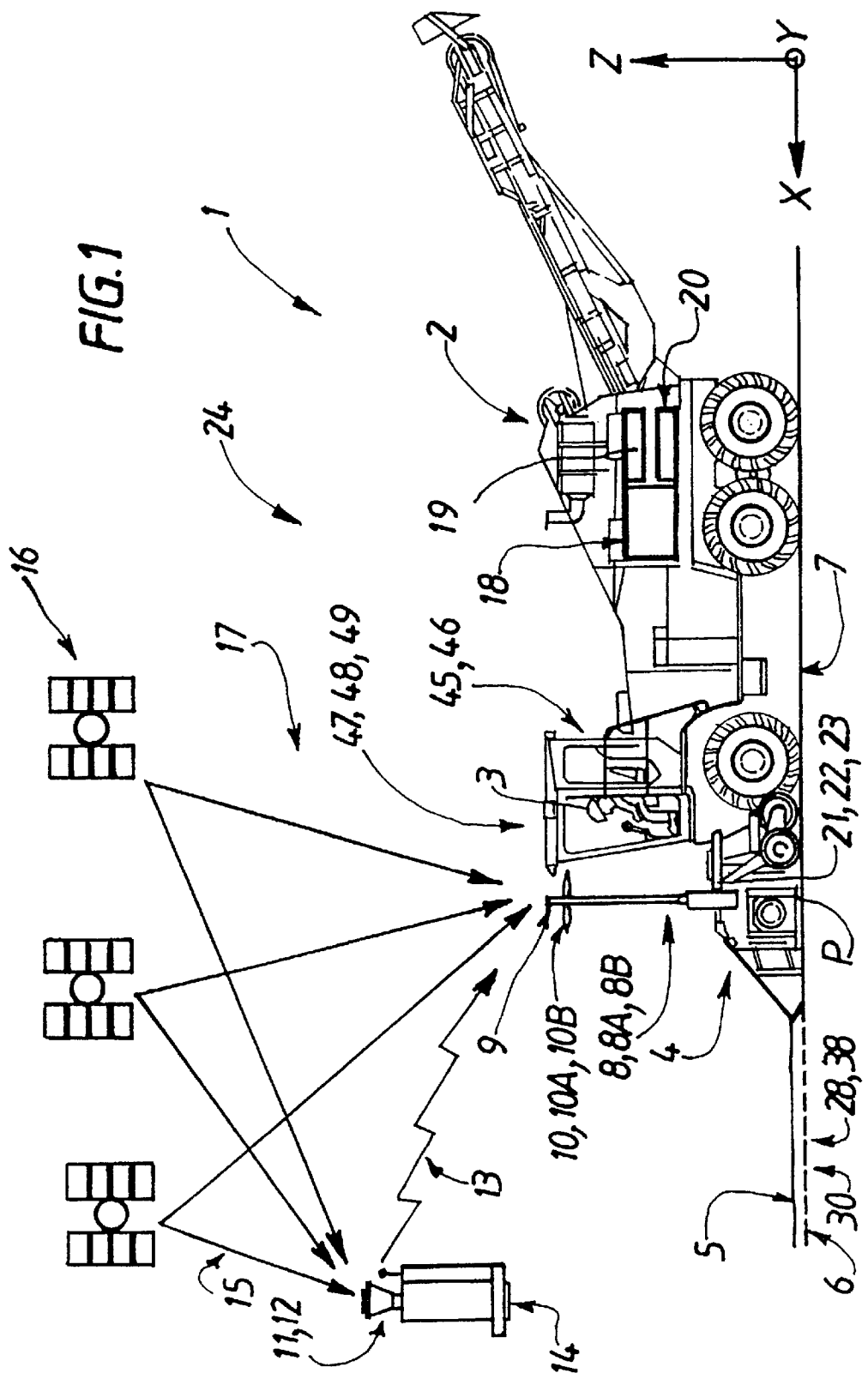
FIG. 1 is a view in schematic longitudinal elevation of an embodiment of a useful form according to the invention.

In FIG. 1, a site 1 can be seen, for example for producing a road, rail, airport or similar linear project, or a non-linear project such as an industrial platform. On the site 1 an earthworks machine 2 is moved. The invention applies also to other machines 2, such as an earth mover, grader, scarifier, bulldozer, snow plough or the like.

FIG. 1 depicts a single machine 2, but the invention applies also to a plurality of machines 2 of the same type and/or- different types, working together, that is to say substantially simultaneously, for example alongside each other or one behind the other. A driver 3 of the machine 2 controls notably the acceleration and braking of this machine. The machine 2 is provided with a tool 4, by means of which it produces, from a body 5 delimited by a three-dimensional envelope such as a site, construction or the like, and according to a theoretical model 6, a useful form 7. At least one mast 8 is here fixed to the tool 4.

In FIG. 1, two substantially vertical masts, respectively left 8A and right 8B, are fixed respectively at its two left and right transverse ends. Each mast 8, 8A, 8B is notably provided with radio communication means 9. Each mast is also provided with a global positioning by satellite receiver referred to as a mobile receiver, respectively left 10A and right 10B.

In an embodiment which is not illustrated, the machine 2 is provided with a single mobile receiver 10, fixed by example to a mast 8 at the centre of the tool 4, and two position sensors, such as camber sensors, inclinometers or the like, fixed for example close to each of the ends of the tool. It will be understood that the number of mobile receivers and their arrangement on the tool 4 depend notably on the form of this tool.

In other embodiments which are not described, in which the form of the tool 4 is different, there are more than two mobile receivers. For example, where the tool 4 is in the form of a triangle, three mobile receivers are disposed on masts at each vertex of the triangle. The radio communication means 9 disposed on these masts 8, 8A, 8B are designed notably to communicate with at least one fixed referential station 11, in communication with the means 9 by means of radio waves 13. This fixed station is installed on the site 1 at a location or point 14, whose topographical location is perfectly known. The point 14 thus serves as a fixed reference for producing the useful form 7.

The fixed station 11 comprises here at least one fixed global positioning by satellite receiver 12, situated vertically from the reference point 14 of the site 1. In FIG. 1, a single fixed station 11 and a single fixed receiver 12 are provided. In some embodiments, several stations 11 and/or receivers 12 are installed on the site 1.

In one embodiment, each receiver 10, 10A, 10B, 12 is a receiver of the GPS type. The fixed receivers 12, and mobile receivers 10, 10A, 10B of the machine 2 are designed to receive signals 15 transmitted by a constellation of satellites 16, for example transmitting GPS signals, three of which are depicted here. Currently, three to ten satellites in a constellation 16 in practice provide the coverage allowing the global positioning of a receiver such as the ones designated here at 10, 10A, 10B and 12.

In the embodiment illustrated, each receiver 10, 10A, 10B, 12 is used according to the following modes:
 dual-frequency;
 differential and for example bidifferential;
 kinematic; and
 real time.
Each satellite in the constellation 16 transmits two types of signal 15, according to the required precision level, namely:

coded acquisition signals, either rough or precise; and
two distance calculation signals, respectively in the form of waves transmitted on two different frequencies, here respectively 1575.42 MHz and 1227.60 MHz. Coded acquisition signals are not used in the invention because of their imprecision of around 25 to 100 metres. However, since the invention aims at a precision of no more than about 10 millimetres, the two distance calculation signals are used according to a so-called bifrequency mode. This bifrequency mode consists of calculating an ambiguity, that is to say counting the number of complete wavelengths produced by each of the two calculation signals in order to travel the distance between a satellite and the receiver to be located. Then a make-up is determined, with a precision of 0.2 mm. The sum of the number of wavelengths or phases and of the make-up is multiplied by the wavelength of each calculation signal in order to determine the distance between the satellite or satellites and the receiver or receivers. In fact the results of the calculation of ambiguity of a fixed receiver 12 with a known position are compared with this known position, and make it possible to determine an instantaneous unitary correction sent by means of the radio waves 13 to the mobile receivers 10, 10A, 10B, which observe the same satellites at the same time: this is the differential mode.

In other embodiments, several fixed receivers 12 are provided, for example two fixed receivers, the operating mode then being said to be bidifferential. One of the two receivers—that of the station 11—being fixed and serving as a reference, the other whose position it is wished to determine being mobile, this mode is termed kinematic.

In addition, since the ambiguity calculations are carried out continuously during the production of a useful form 7, here real-time mode is spoken of. These different modes make it possible to obtain, in the production of the useful form 7, a degree of exactitude necessary for achieving the precision objectives of the invention. However, the latter makes it possible to achieve these objectives with other techniques provided that they provide an equivalent or greater degree of exactitude.

A global positioning system such as the GPS system is generally capable of effecting position calculations at a frequency F. This frequency F is here 1 Hz. The results of the position ambiguity calculations are said to be synchronous points. Between these points, the global positioning system can extrapolate points at a higher frequency, for example F/10, that is to say here 10 Hz. In practice, the extrapolation is degraded when the radio transmission becomes more random, for example when objects are interposed between the fixed receivers 12 and the mobile receivers 10, 10A, 10B or when the distance between them becomes too great, for example around 15 km.

In one embodiment, the extrapolated data are not used, but only the synchronous points. The calculation of these synchronous points is made here for each receiver. The receivers 10, 10A, 10B and 12, the station 11, the radio communication means 9 and the satellites notably form a positioning module 17 which transmits position information to a computer 18 at each instant N, for example in the form of digital signals.

In one embodiment, the computer 18 is mounted on or in the machine 2. In other embodiments, it is situated on the site, for example at the fixed station 11. On the one hand, the information transmitted by the positioning module 17 to the computer 18 relates at least to the position of the mobile receivers 10, 10A, 10B, and therefore notably to the position of the left and right-hand ends of the tool 4 of the machine 2 on the site 1. This position is said to be the measured position of the tool 4. On the other hand, the computer 18 receives information, for example in the form of digital signals, from a digitisation module 19, also illustrated in FIG. 1 notably. This digitisation module 19 is here an assisted design (CAD) computer program, which functions on a computer. The digitisation module 19 is here installed on the machine 2. Like the computer 18, in some embodiments, it is situated on the site 1, for example in a shelter for personnel working on the site 1 or on the station 11.

In the digitisation module 19 there is archived, that is to say memorised or stored, a theoretical model 6 representing a topographical profile as required with a view to its embodiment. In parallel to the measured position information transmitted from the positioning module 17 to the computer 18, the digitisation module 19 transmits information to the computer 18 at each instant N, indicating notably a required instantaneous position of each of the tool 4 within the theoretical model 6. This position is said to be the theoretical position, and is illustrated at $P_{TH}$ in FIGS. 4 and 5.

The computer 18 compares the theoretical and measured positions for notably each end of the tool 4. For each comparison a deviation denoted E(N) is calculated, this deviation being calculated at each instant N, at the frequency F. The computer 18 then processes the deviations, with a view to acting if necessary on the position of the tool 4, notably the position of each of its ends. Thus, at each instant, it is possible to act on the tool 4 in order to make its measured and theoretical positions converge or coincide.

As will be seen later, in certain situations, the measured and theoretical positions do not coincide perfectly in practice. Paradoxically, in order to achieve the precision sought by the invention, the latter does not solely consider the theoretical positions and models. In fact it processes the data selectively so that the useful form 7 is included within a tolerance zone surrounding these theoretical positions and models.

It will be understood subsequently that the invention in some way allows the measured position to be momentarily distinct from the theoretical position, in order to proceed with a limited convergence of the real profile towards the theoretical profile. This is why such a tolerance zone is defined around each theoretical position. Here this zone is equal to ±13 mm. Naturally, according to the quality requirements, embodiments of the invention provide for a wider tolerance zone, for example ±15 mm, ±20 mm, or even ±50 mm.

The processing of the deviations by the computer 18 will next be returned to, the convergence of the useful form 7 towards the theoretical model 6 resulting from this processing. Each time such a processing is carried out, the computer 18 transmits a reference, in the form of digital signals for example, to an automatic controller 20, here programmable and mounted on the machine 2 (FIG. 1). The automatic controller 20 then converts the digital signals into analogue control signals. The automatic controller 20 transmits these analogue signals notably to elevation control valves, here hydraulic, left hand 21, right hand 22 and direction 23 of the tool 4, in order to control them. The left-hand 21 and right-hand 22 elevation control valves make a correction respectively of the elevation position of the left-hand and right-hand ends of the tool 4. Whilst the function of the control valve 23 is to orient the machine 2 and/or the tool 4 about the elevation direction Z, here by acting on steered wheels of the machine 2.

In one embodiment the direction control valve 23 acts on the orientation of the tool 4 with respect to the machine 2, and independently of the steered wheels of the latter. It should be noted that, here, a control valve 21, 22 and 23, such as a double-acting ram, is respectively allocated to each right and left elevation and orientation correction function. Some embodiments provide at least two control valves for each of these functions, such as a single-acting ram in opposition. In a similar fashion hydraulic control valves are described here, but other power sources, for example electrical, are employed in some embodiments.

Figure 2:
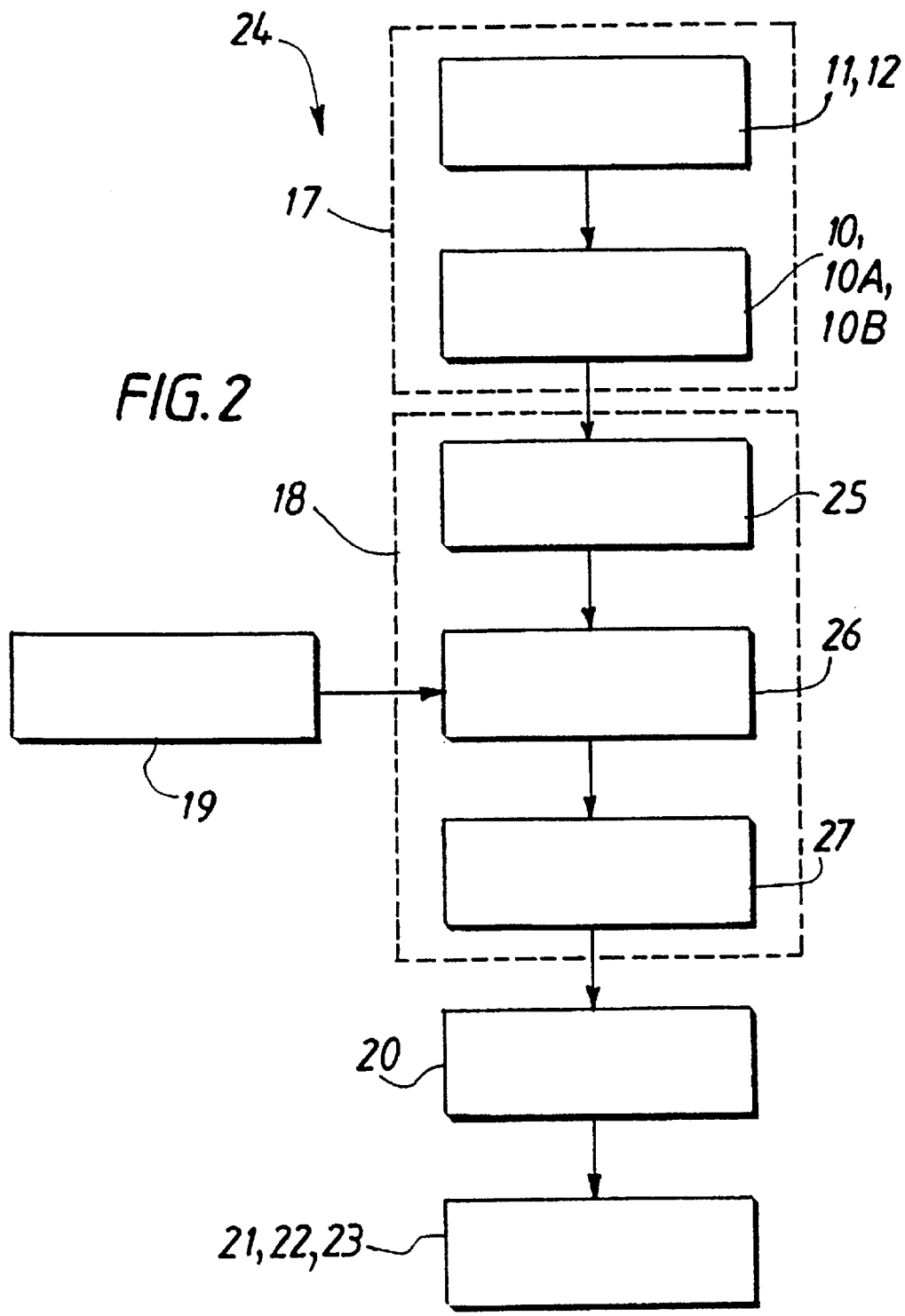
FIG. 2 is a block diagram of the device, illustrating the functioning of one embodiment of the method according to the invention.

The control valves 21, 22 and 23 appear also in FIG. 2, which illustrates a putting into practice of the method according to the invention. This FIG. 2 depicts schematically a control and slaving device 24 according to the invention which comprises notably the positioning module 17, the computer 18, the digitisation module 19, the automatic controller 20 and the left-hand 21, right-hand 22 and direction 23 control valves for the tool 4.

The computer 18 comprises notably three sub-systems:
a decoding and filtering kernel 25;
a location kernel 26; and
slaving means 27.

The kernels 25 and 26 are, according to the examples, digital calculation computer programs, applications resulting from digital calculation software, or the like.

In one embodiment, the decoding and filtering kernel 25, and the location kernel 26, form part of a common sub-system of the computer 18. It is also clear from FIG. 2 that the positioning module 17 transmits to the computer 18, at each instant N, information in the form of coded messages known as frames, relating to the longitudinal, transverse and elevation position of each mobile receiver 10, 10A, 10B. It will be understood that, substantially to within the length—constant and known—of a mast 8, 8A, 8B, the elevation position of an end of the tool 4 is immediately deduced from the position of the corresponding receiver 10, 10A, 10B.

In FIGS. 3 to 5, the respective positions in the longitudinal X, transverse Y and elevation Z directions of each end of the tool 4 in the reference frame defined above are designated as x, y and z. These positions vary over time, and are designated in general terms as x(N), y(N) and z(N). Thus, for each given instant at which one end of the tool 4 is situated at a point P, these positions are designated as x(P), y(P) and z(P). The obtaining of the positions x, y, z is not immediate. It requires first that the decoding and filtering kernel 25 should receive the information or frames from the positioning module 17.

The reception of the frames from the positioning module 17 to the computer 18 of the control and slaving device 24 is effected here in two steps. Firstly, the kernel 25 decodes the two frames substantially simultaneously, at the single frequency F defined by the high-precision clock of the global positioning system. To this end, a communication algorithm of the computer 18 then decodes or deciphers the two frames, coming from the receivers 10, 10A, 10B. Each frame thus decoded is then associated with the corresponding instant N, according to the local time of the global positioning system. When a receiver 10, 10A, 10B is unable to supply information, for example in the case of non-reception of a wave 15 or a calculation error, it does not send a frame. By monitoring the frequency of arrival of the frames, the kernel 25 detects and identifies the stoppage of at least one receiver 10, 10A, 10B.

Next, that is to say after having decoded them, the kernel 25 filters the frames. It is known for this filtering that, under normal conditions of production of a useful form 7, it is improbable that two consecutive measurements of the global positioning system represent a deviation in elevation of more than 100 mm. This is because the deviation in elevation between two points longitudinally distant along the useful form, by a few hundreds of millimetres, is very small: for example, a slope of 10% at a speed of 2 km/h for 1 sec gives rise to a variation in elevation or altitude of 60 mm. The kernel 25 is therefore arranged so as to filter, that is to say eliminate, all the measurements whose deviation with the previous measurement is greater than 100 mm.

According to the invention, the computer 18 has a processing memory such as a random access memory, arranged so that the data of the previous measurement are nevertheless kept as a reference, but only up to the following processing. After each processing, the memory of the computer 18 erases (or possibly transfers to mass recording means such as a hard disk), the data of the ante-penultimate measurement. For example, the mass recording means are at a distance from the machine 2 and connected to the computer by transmission means, for example via the returning radio wave 13. It is therefore not necessary to have recourse to complex data processing means, thanks to the invention. Whilst being able to produce a useful form 7 of high precision, at a high processing speed. At the end of this filtering, the computer 18 carries out a location calculation by means of the kernel 26. To make this calculation, the location kernel 26 uses notably data coming from the digitisation module 19 mentioned above.

The main functions of this module 19 are notably:

importation of data relating to the theoretical model 6 issuing from a computer-aided design;

construction of such a theoretical model 6 from paper data;

simulation of the movement of a machine 2 on this model, in order to check the consistency of the data;

display of the "axis in the horizontal plane" and of the "longitudinal profile" of the theoretical model 6; and creation of computer files for the computer 18.

In the module 19, the model 6 is here defined by at least one arch axis 28 and at least one, and for example a plurality of, cross-sectional profiles 29. The arch axis 28 is stored in the digitisation module 19 by means of two lines known as the axis in the horizontal plane and the longitudinal profile, corresponding to two views, respectively plan and longitudinal elevation. This arch axis is a continuous succession of bidimensional geometric curves 30 defined by simple mathematical equations, such as straight lines, arcs of a circle, parabolae, and connecting curves known as "clothoids" notably. Whilst the cross-sectional profiles 29 model as many transverse elevation sections of the topographical profile along the arch axis 28.

This mathematical definition of the theoretical model 6 thus makes it possible to archive or store the latter in a small memory space such as a few tens of kilobytes of memory in the digitisation module 19. In addition, it is possible to access one or some useful parts only of the theoretical model 6 for processing by the computer, for example by means of a sliding file or the like. The invention therefore does not require a complete digital modelling of the model 6, such as a series or "pattern" of points, which also makes it possible to use modest data processing means. This also helps to achieve a high processing speed. In addition, it is also possible to save time during the transfer of data between the digitisation module 19 and the computer 18.

Each location calculation as explained consists of determining elements relating to the actual position of a point P, which defines here a transverse end of the tool 4 of the machine 2. This point P appears in FIGS. 1, 3, 4 and 5. The point P is dependent on the instant N, and can therefore be denoted P(N). The elements relating to the position of the point P at an instant N are here:

its curved abscissa s(P) on the arch axis 28 of the model 6 of the useful form 7;

its abscissa x(P) measured in the longitudinal direction X, merged with the abscissa x(N) defined above;

its ordinate y(P) measured in the transverse direction Y, merged with the ordinate y(N) defined above;

its elevation or altitude position z(P) measured in the vertical direction Z, merged with the altitude z(P) defined above;

its theoretical elevation or altitude position $Z_{TH}(P)$ on the theoretical model 6;

a bearing B of the useful form 7 at point P, that is to say the transverse angle of the tangent of P to the arch axis 28 with respect to the instantaneous longitudinal axis of the tool 4;

the camber of the useful form 7 at point P;

the offset at point P, that is to say the distance from the centre of the tool 4 to the arch axis 28 of the theoretical model 6 of the useful form 7;

the slope of the useful form at point P in a longitudinal elevation plane;

any calculation error or errors;

an element of the axis in. the horizontal plane of the useful form 7 close to the point P as illustrated-in FIG. 3;

a horizontal profile element close to the point P as illustrated in FIG. 4; and the cross-sectional profile 29 at point P as illustrated in FIG. 5.

This non-exhaustive list represents one embodiment.

In some embodiments, elements are added or eliminated from this list, without departing from the scope of the invention. The altitude z(P) is obtained by measurements made by the global positioning receivers 10, 10A, 10B, 12. As for the theoretical altitude $Z_{TH}(P)$, this is derived by the computer from the theoretical model and the measured longitudinal and transverse positions of the point P. The measured altitude z(P) of point P is compared with precision with the theoretical altitude $Z_{TH}(P)$ of point P on the model 6. The deviation E(N) is derived from this comparison, defined here by:

$$E(N)=z(P)-Z_{TH}(P)$$

A positive deviation indicates that the tool 4 is positioned too high, that(is to say above the model 6 in the direction Z. A negative deviation indicates that the tool 4 is positioned too low, that is to say below the model 6 in the direction Z. When the measured altitude z(P) is merged with the theoretical altitude $Z_{TH}(P)$, the deviation E(N) is zero, and is said to be a zero deviation, denoted E0.

It has been seen that the deviation E(N) is derived from the positioning information supplied by the receivers 10, 10A, 10B. If this information had a precision less than that sought for the useful form 7, the transmission, to the control valves 21, 22 and 23 of the tool 4, of a slaving reference— E(N) equal to the opposite of the deviation E(N), would suffice to make the measured and theoretical altitudes of the tool 4 coincide. However, in practice, the information supplied by the receivers 10, 10A, 10B oscillate: the "measurement noise " is then spoken of.

It has also been found that this noise is centred on the average of the indications with a standard deviation ET of approximately 15 mm. So that oscillations inherent in the global positioning receivers are not found in the design of the useful form 7, it is necessary to be free of this noise. To this end, the computer 18 processes the deviations E(N) at each point P. It is thus possible to make the useful form 7 produced by the tool 4 converge in a limited fashion towards the theoretical model 6. Here this convergence is limited, in order to avoid erroneous corrections to the tool 4, due for example to errors in measurement of the receivers 10, 10A, 10B, or to irregularities to which the tool 4 is subject when working on the envelope 5, for example in contact with hard spots such as stones or the like.

In one embodiment, the processing of the deviations is computerised, and carried out by the slaving means 27 of the computer 18. This processing notably makes provision for classifying the deviations E(N) in at least two different analysis bands 29, 30, 31 illustrated in FIG. 9. For each deviation E(N) there is thus derived a corresponding reference C(P) intended for at least one of the control valves 21, 22 or 23 of the tool 4. Each analysis band is here an interval containing a set of deviations.

Figure 9:
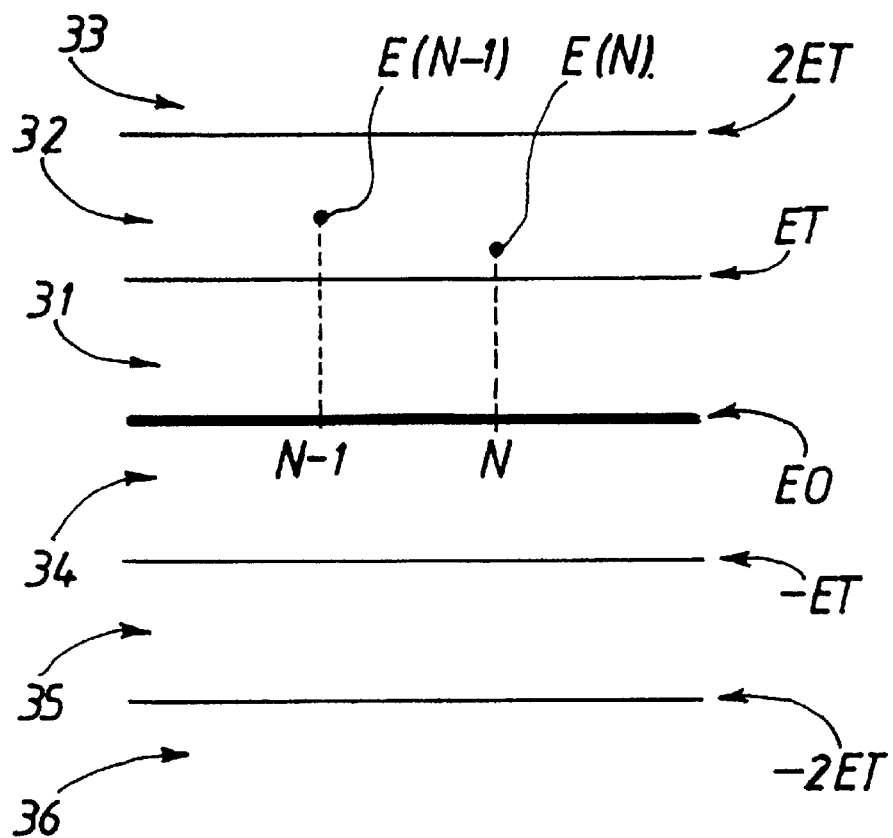
FIG. 9 is a diagram illustrating an embodiment of the invention, in which there can be seen deviations classified in analysis bands, defined with respect to the zero deviation.

In one embodiment, six analysis bands are provided, including a pair of centre analysis bands 31, 34, a pair of median analysis bands 32, 35 and a pair of external analysis bands 33, 36 (FIG. 9). Amongst these analysis bands, three, respectively centre upper 31, median upper 32 and external upper 33, cover all the deviations greater than the zero deviation E0. Whilst three other analysis bands, respectively centre lower 34, median lower 35 and external lower 36, cover all the deviations below the zero deviation E0.

In this figure, the centre analysis bands respectively upper 31 and lower 34, median respectively upper 32 and lower 35, and external respectively upper 33 and lower 36, are in pairs symmetrical with respect to the zero deviation E0. Here the upper centre analysis band 31 is defined by all the deviations lying between the zero deviation and the standard deviation ET. Whilst the upper median analysis band 32 is defined by all the deviations lying between the standard deviation ET and the double of the standard deviation, denoted 2ET. And the upper external analysis band 33 is defined by all the deviations greater than double the standard deviation 2ET. The analysis bands being here symmetrical in pairs, it will be understood that the lower centre analysis band 34 is defined by all the deviations lying between the zero deviation E0 and the opposite of the standard deviation, denoted −ET. Whilst the lower median analysis band 35 is defined by all the deviations lying between the opposite of the standard deviation −ET and the opposite of double the standard deviation, denoted −2ET. And the lower external analysis band 36 is defined by all the deviations less than opposite the double of the standard deviation −2ET.

The symmetry of the analysis bands aims to simplify the deviation processing calculations, and helps to achieve a high processing speed of the invention. This is because, if the processing of a deviation E(N) results in a reference C(P), then the processing of the opposite deviation, denoted −E(N), results in an opposite reference, denoted −C(P). This therefore makes it possible, in processing all the deviations, to consider only their absolute value.

In some embodiments, the analysis bands are defined differently, for example the analysis bands are not symmetrical with respect to the zero deviation. In other embodiments, only two analysis bands are provided, for example these analysis bands are defined on the one hand solely from the zero deviation E0 and/or the theoretical model 6.

An example of implementation of the invention is now described. Let therefore E(N) be a deviation calculated at instant N. If the deviation E(N) is in the upper external analysis band 33 or lower external analysis band 36, then the absolute value of the reference C(P) corresponds to an elevation distance of 10 mm. If the deviation E(N) is in the median analysis band respectively upper 32 or lower 35, then the slaving means 27 calculate a quantity D, defined here by the difference between the absolute value of the deviation E(N) and the absolute value of the respectively lower or upper delimiter, here ET, of this analysis band. From this difference a slaving reference C(P) is derived. So that the convergence of the useful form 7 towards the theoretical model 6 is limited, the absolute value of the reference C(P) is at a maximum equal to a maximum median action value C1, corresponding for example to an elevation distance of 10 mm. Likewise, for this convergence to be sufficiently rapid, the absolute value of the reference C(P) is at a minimum equal to a minimum median action value C2, corresponding for example to an elevation distance of 4 mm. The slaving means 27 compare the quantity D with the values C1 and C2. If the quantity D is greater than the maximum median action value C1, then the absolute value of the reference C(P) is chosen so as to be equal to this value C1. If the quantity D is less than the minimum median action value C2, then the absolute value of the reference C(P) is chosen so as to be equal to this value C2. Whilst if the quantity D is between the values C1 and C2, then the absolute value of the reference C(P) is chosen so as to be equal to the quantity D. Where the deviation E(N) is in the upper 31 or lower 34 centre analysis band, then the slaving means 27 calculate a difference D' between the respective absolute values of the deviation E(N) and of the previous deviation E(N−1/F), where (N−1/F) is the calculation instant immediately preceding the instant N.

Figure 10:
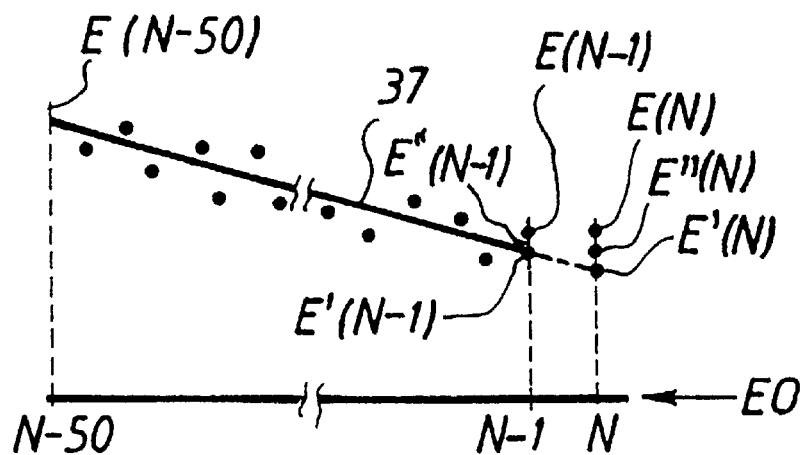
FIG. 10 is a diagram illustrating an embodiment of the invention, in which a regression curve can be seen, defined with respect to the zero deviation.

Here, since the frequency F is equal to 1 Hz, the notation (N−1) is equivalent to the notation (N−1/F). If the difference D' is negative or zero, then the reference C(P) is chosen so as to be zero. If the difference D' is positive, then the calculation of the reference C(P) follows rules equivalent to those followed for the upper 32 and lower 35 median analysis bands, applied here to a quantity Q' equal to a fraction, for example one third, of the difference D'. The slaving means 27 therefore compare this quantity Q' with two other values C3 and C4, corresponding here respectively to elevation distances of 4 mm and 1 mm. If the quantity Q' is greater than the value C3, referred to as the maximum centre action, then the absolute value of the reference C(P) is chosen so as to be equal to this value C3. If the quantity Q' is less than the value C4, referred to as the minimum centre action, then the absolute value of the reference C(P) is chosen so as to be equal to this value C4. If the quantity Q' is between the values C3 and C4, then the absolute value of the reference C(P) is chosen so as to be equal to this quantity Q'. In one embodiment, a regression curve 37, illustrated in FIG. 10, is provided in the processing of the deviations. This regression curve, here a straight line, defines the average change in the deviations in the course of a predetermined interval of time. These deviations are, in the embodiment illustrated in FIG. 10, the fifty deviations calculated immediately before the deviation E(N), the latter being calculated at the instant N. The regression curve, which therefore depends on the instant N, makes it possible, by extrapolation at this instant, to calculate a so-called regression deviation E' (N). A corrected deviation E" (N) is then calculated from the deviation E(N) and the corresponding extrapolated deviation E' (N), this corrected deviation being equal to a weighted mean of the latter. Likewise, a previous corrected deviation E" (N−1) is calculated as being a weighted mean of the previous deviation E(N−1) and of a corresponding previous extrapolated deviation E' (N−1).

In the caylculation of the slaving reference, the deviations E(N) and E(N−1) are then replaced respectively by the corrected deviations E" (N) and E" (N−1). This makes it possible notably to weight an excessively abrupt change in the deviations over time by acting on the value of the slaving reference C(P). Each reference C(P) thus calculated is transmitted to the automatic controller 20 by the slaving means 27, for example in the form of a digital signal. The automatic controller 20 then converts it into an analogue signal, which it transmits to the elevation control valves 21, 22 of the tool 4. The elevation control valves 21, 22 modify the position in the direction Z of the tool 4 according to the reference which is transmitted to them.

For example, when the deviation calculated at a point P for the left-hand end of the tool 4 is positive, which indicates that the tool 4 is then situated above its theoretical position, the left-hand elevation control valve 21 receives a reference C(P) with a positive sign such that the tool 4 is moved downwards by a distance equal to the value of C(P). Conversely, when this deviation is negative, the control valve 21 receives a reference C(P) of negative sign such that the tool 4 is moved upwards by a distance equal to the absolute value of C(P).

The transverse dimension or width of the useful form 7 to be produced is often greater than the width of the tool 4. Since producing the useful form cannot be effected in a single pass, the machine therefore proceeds in several successive passes. To each pass there corresponds an auxiliary guidance line 38, which represents for the machine 2 the path to be followed, for example a straight line, a spiral or an arc of a circle. The direction control valve 23 makes it possible notably to control the longitudinal path of the machine 2 transversely during the production of the useful form 7. There is thus a tendency to make this path coincide with a guidance line.

The path of the machine 2 is thus analysed by the slaving means 27 according to the parameters supplied by the location kernel 26, notably the offset of the point P and the angle or bearing B between a line orthogonal to the front end of the tool 4 and the tangent to the guidance line 38 in a plane locally tangent to the useful form 7. According to these parameters and the direction of movement of the machine 2 along the arch axis 28, the slaving means 27 calculate the angle of rotation of the steered wheels, so that the offset and the bearing B converge towards substantially zero values. When this offset and bearing are zero, it is considered that the path locally coincides, as required, with the guidance line. Similatly to the processing of deviations in elevation, according to this bearing B, the slaving means 27 calculate a transverse reference which is transmitted to the direction control valve 23 by the automatic controller 20.

It will be understood now that the invention makes it possible on the one hand for the tool 4 to produce a useful form 7 which converges towards the theoretical model 6, both vertically (in elevation) and horizontally (transversely). Moreover the invention makes it possible, in addition to producing useful forms 7 whose camber is constant, to produce useful forms 7 whose camber has discontinuities (6, 7 and 8).

These figures depict respectively successive steps or passes in producing such a useful form with discontinuity. In these figures, the tool 4 produces a useful form 7 said to be broken transversely, which comprises at least two portions 39, 40 with different cambers, separated by a break 41.

Figure 6:
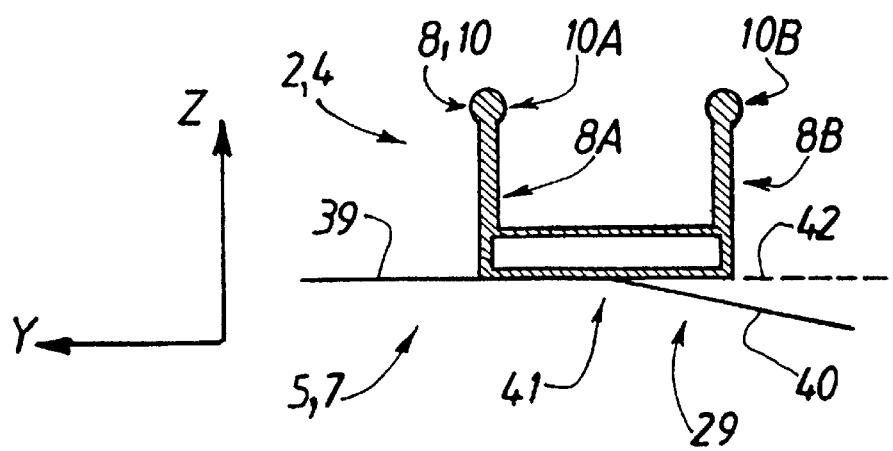
FIG. 6 is a view in transverse elevation section of a tool on a machine according to the invention, and of a useful form in the course of production by the method of the invention, according to a so-called priority to the left of the tool or "priority to the left"

FIG. 6 depicts a so-called initial step of producing the form 7. During the production of a useful form 7, the tool 4 may be situated so as to jut out with an active part in contact transversely to the left against a left-hand portion of the body 5 and/or of the form 7, whilst an inactive part of the tool 4 is not in contact with the useful form 7. In this case, a receiver 10, 10A, 10B has one end in contact with the useful form 7, here the receiver 10A of the left-hand mast 8A, and is said to have priority with respect to the other receiver; it is said that the device 24 is functioning in priority mode to the left of the tool.

It goes without saying that, in some embodiments the portion corresponding to the one designated here as the right-hand portion is for example an unworked part forming part of the body 5 rather than of the form 7. According to this priority to the left mode, the calculation of the location of the left-hand end of the tool 4 is based on its measured position, whilst that of the right-hand end takes into account its measured position with respect to an imaginary right-hand portion 42 merged with the lower useful edge of the tool 4, situated transversely in line with the left-hand portion, and with the same camber as the latter.

Figure 7:
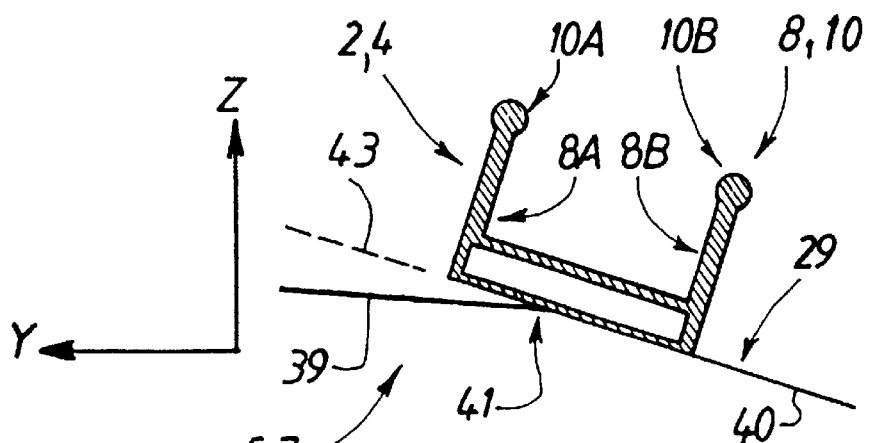
FIG. 7 is a view in transverse elevation section of the tool of the machine of the invention, and of a useful form in the course of production by the method of the invention, according to a so-called priority to the right of the tool or "priority to the right"

FIG. 7 depicts a so-called intermediate step of producing the form 7. The part of the tool 4 which was in contact with the left-hand portion is here at least partially above this portion, whilst the part of the tool 4 initially inactive is at least partially in contact now with the portion. The tool 4 is therefore now overhanging with the right-hand portion, whilst at least part of the tool 4 is in contact with the useful form 7. In this case, the receiver relating to the end in contact with the useful form 7, here the right-hand receiver 10B, is said to have priority with respect to the other receiver: it is said that the device 24 is functioning in priority mode to the right of the tool. In this mode of functioning, the calculation of the location of the right-hand end is based on its measured position, whilst that of the left-hand end is based on its position on an imaginary left-hand portion 43 situated in line with the right-hand portion, and with the same camber.

Figure 8:
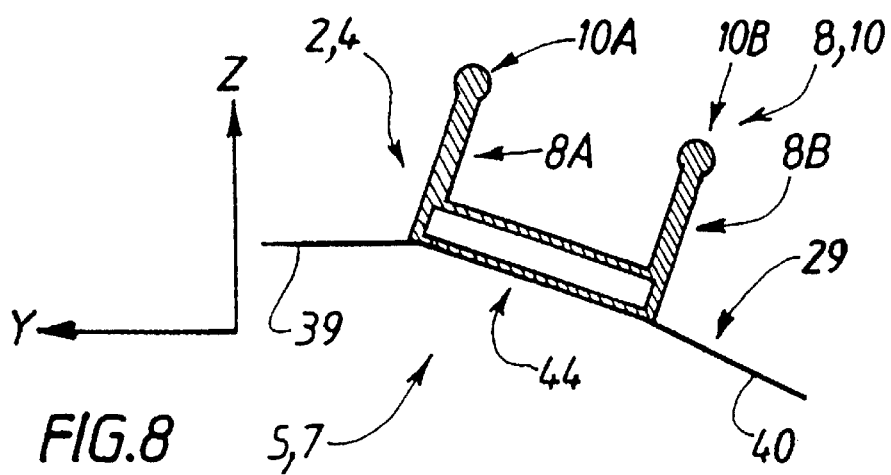
FIG. 8 is a view in transverse elevation section of a tool of a machine of the invention, and a useful form in the course of production by the method of the invention, in so-called "without priority" mode.

In FIG. 8, the tool 4 produces, on the useful form 7, a portion 44 providing connection between a left-hand portion and a right-hand portion with different cambers. Here the two ends of the tool 4 are in contact with the useful form 7: no receiver has priority with respect to the other. It is said that the device 24 is functioning in a no-priority mode. The calculations of location for the right-hand and left-hand ends of the tool 4 are then based on their measured positions on the useful form 7.

In the example illustrated, the choice of priorities is entrusted to the driver 3 of the machine 2 (FIG. 1). One design makes provision for automating this choice by equipping the tool 4 with proximity sensors for the envelope 5 with respect to each of its ends, so that, if a predetermined distance is read by a sensor, for example on the right, priority is given to the left. A single machine 2 can produce a useful form 7 broken transversely by producing a left-hand portion and then at least a right-hand portion, for example a plurality of other portions with different cambers. Provision is however made, in some embodiments, for several machines 2 working one after the other and each producing at least a portion of the same broken useful form 7.

In other embodiments, not illustrated, the same machine or a plurality of different machines can effect several successive passes in elevation following the same auxiliary guidance line. In addition, the invention makes it possible to re-establish an existing useful form 7.It is thus possible notably to change the covering on a road profile, or to add an additional layer of new covering on top of a worn covering. Provision is then made for effecting a measurement pass of the existing useful form 7 for storing geometric curves 30 in the digitisation module 19.

The invention makes it possible to produce a useful form 7 such that the camber of this useful form is variable in a transverse elevation plane, along the arch axis 28. Such forms 7 are usual for example on linear sites 1 such as road interchanges, or railway tracks. The variations in camber along the arch axis 28 are entered in the digitisation module 19. The computer 18 makes notably a linear interpolation between the different cross-profiles of the theoretical model 6, either successive or contiguous. This interpolation is carried out in real time. This avoids, as mentioned above, having to store and process a complex theoretical model 6, which requires complicated data processing means and slows down their functioning.

The elevation and direction control valves 21, 22, 23 are slaved and act on the tool 4 accordingly. The invention makes it possible to travel through a theoretical modal 6 along the arch axis 28, freely in one direction or in the opposite direction.

Thus, in one embodiment, the device 24 has a direction analysis unit which automatically recognises the direction of travel of the machine 1 along the arch axis 28. This recognition is effected for example by means of one or more sensors situated on the transmission system of the machine 2, such as its motor, its transmission, its wheels or its hubs. This recognition appreciably broadens the scope of the invention. More generally, being able to run through the model 6 in one direction or the other facilitates for example the production of a broken useful form 7 (FIGS. 6 to 8). This is because the same machine 2 can then produce, during an initial pass, an initial portion, for example left-hand in a given direction along an initial auxiliary guidance line, and then, during at least one subsequent pass, a subsequent portion, for example right-hand, in the same direction or in another direction along a subsequent auxiliary guidance line, and so on if necessary. In addition, errors have been found during the production of a useful shape 7, such that this shape 7 might not locally correspond with precision to the model 6.

According to the invention, the computer 18 can automatically identify some of these errors, for example an absence of position measurement by at least one of the receivers 10, 10A, 10B, a failure in communication such as an incomplete frame, an error in digitisation of the theoretical model 6 in the module 19, transmission errors between the module 17 and the computer 18, a calculation error in the slaving means 27 or an error in positioning the machine 2 on the useful form 7. When such an error is identified, the device 24 is switched from an automatic mode into manual mode, under the effect of the computer 18.

In automatic mode, the movements of the machine 2 and of the tool 4 notably are entirely controlled by the control device 24. Whereas in manual mode, these movements are controlled by the driver 3 of the machine 2.

In one embodiment, a steering lever 45 of the driver 3 has priority over automatic mode: a simple movement of this lever suffices to cause the device 24 to change into manual mode and to give the driver 3 full control of the machine 2. Whilst when the driver 3 releases the lever 45, the device 24 immediately goes back into automatic mode.

In one embodiment, the switching from automatic mode to manual mode is also effected by activation of an emergency stop mode, for example by pressing an emergency stop button. It should also be noted that, in one embodiment, the machine 2 is provided, in a cab 39 for example, with display means such as at least one cathode ray or liquid crystal screen; for example three screens are disposed opposite the driver 3. These screens are for example a welcoming and parameterising screen 47, a working screen 48 and a geometric information screen 49.

In one embodiment, the display means are touch screens. The welcoming and parameterising screen 47 enables the driver 3 notably to initialise the device 24, for example when it is started up or after a transmission problem relating to a receiver 10, 10A, 10B, 12. As for the working screen 48, this enables the driver 3 notably to follow changes in the tool 4 in its successive positions measured with respect to its theoretical positions on the model 6, and therefore to display the references transmitted to the automatic controller 20 by the computer 18 and error messages.

Finally, the geometric information screen 49 indicates notably to the driver 3 the progress of the machine 2 on the model 6 in horizontal plane axis view, in longitudinal profile view, and a list of parameters such as the one defined above, for each end of the tool 4.

What is claimed is:

1. A method of producing a projected useful form (7) such as a road project surface, from an existing body (5) delimited by a three-dimensional envelope, such as a construction site, a building or the like, using a tool (4) mounted on a machine (2), for example an earthwork machine for a construction site )or the like; this machine (2) cooperating with a global satellite positioning system of the bifrequency, differential, kinematic and real time type such as GPS; the machine (2) having at least one global positioning receiver (10; 1A; 10B), for example on its tool (4), in order to be moved according to a theoretical model (6) of the form (7); characterised in that it includes the steps making provision for:

storing fixed geometric curves (28, 30) peculiar to the useful form, including at least one substantially longitudinal arch axis (28) and at least one cross-sectional profile (29);

measuring, at at least one moment (N), the elevation (z(P)), longitudinal (x(P)) and transverse (y(P)) position of the tool, using a receiver (10; 10A; 10B) when the tool is moved, for example at a predetermined frequency (F);

associating a position along the arch axis (28) with this measured position;

locally calculating the theoretical model (6) whilst making a cross-sectional profile (29) of the useful form (7) correspond to this location; activating in memory a standard deviation (ET) signifying an uncertainty characteristic of the global positioning system, possibly after it is determined during a phase of calibrating the receiver (10; 10A; 10B);

comparing, during the movement of the tool (4), for example at the predetermined frequency (F), a measured elevation position (z(P)) of the tool with a theoretical altitude ($Z_{TH}(P)$) defined from the model (6);

deducing from this comparison a deviation (E(N)) in elevation at the time of measurement (N), such that this deviation is said to be a zero deviation (E0) when the measured elevation position (z(P)) is substantially the same as the theoretical altitude ($Z_{TH}(P)$);

defining on the one hand at least from the zero deviation (E0) at least two analysis bands, for example two centre bands respectively upper (31) and lower (34), two median bands respectively upper (32) and lower (35), and two external bands respectively upper (33) and lower (36), these bands being for example symmetrical in pairs, lower and/or upper delimiters of these analysis bands being proportional to the standard deviation (ET);

identifying an active analysis band (31, 36) to which this deviation in elevation (E(N)) belongs;

calculating, according to the deviation (E(N)) and the active analysis band, an elevation slaving reference (C(P)), a ceiling for whose value is set according to the active analysis band identified; and controlling the elevation position of the tool (4) according to the calculated reference (C(P)), so that this tool is either momentarily left in position, or brought closer, in a limited manner, to the model (6) by an elevation distance substantially proportional to the absolute value of the reference (C(P)).

2. A production method according to claim 1, characterised in that the theoretical model (6) of the useful form (7) is calculated locally from notably at least:

the arch axis (28), defined mathematically, notably by a line known as the axis in the horizontal plane and by a longitudinal profile, defined themselves by at least one continuous and derivable parameterised function, and including at least part of a geometric curve (30), and for example a succession of such parts, each being defined mathematically by a continuous parameterised function, such as a straight line, arc of a circle, parabola, clothoid or the like; and a cross-sectional profile (29), defined mathematically by a continuous parameterised function, for example each cross-sectional profile is a succession of end to end straight line segments.

3. A production method according to claim 1, characterised in that it is intended for re-establishing an existing useful form (7), and including, at the time of storage of the geometric curves (30), at least one phase making provision notably for a measuring pass over the existing useful form, for example with a machine (2) similar to the one provided for effecting the re-establishment.

4. A production method according to claim 1, characterised in that a step of lateral or directional control of the longitudinal path of the machine (2) and/or of the tool (4) is provided during the production of the useful form (7), this step including the phases making provision for:

defining an auxiliary guidance line (38) which must be followed by the machine (2) during a given pass of the production, this guidance line being for example at a substantially constant distance from the arch axis (28);

analysing the measured lateral position in the horizontal plane of the tool (4) according to measurements supplied by the receiver (10; 10A; 10B); and according to the parameters obtained by this analysis, calculating a lateral slaving control of the machine (2) able to make a trajectory of the machine (2) in the horizontal plane coincide with the auxiliary guidance line (38).

5. A production method according to claim 1, characterised in that, from at least part of the zero deviation (E0), three analysis bands are provided, namely:

a first analysis band close to the zero deviation (E0), said to be centre (31) and defined by a set of deviations;

a second analysis band, said to be median (32) and defined by deviations greater than those of the centre band; and a third analysis band, further away from the zero deviation (E0) than the centre and median bands, said to be external (33) and defined by a set of deviations greater than those of the median band;

possibly from another part of the zero deviation (E0), other analysis bands (34, 35, 36) being provided, for example symmetrical with the centre, median and external bands with respect to the zero deviation (E0).

6. A production method according to claim 1, characterised in that, the analysis bands being symmetrical, for example greater or lesser with respect to the zero deviation (E0), the processing of all the deviations considers only their absolute value, the reference (C(P)) corresponding to a deviation (E(N)) of negative sign being equal to the opposite of the reference issuing from the processing of the absolute value of this deviation.

7. A production method according to claim 1, characterised in that the theoretical model (6) is able to have the machine (2) run through it along the arch axis (28) and/or along an auxiliary guidance line (38), freely in one direction or another, for example the opposite direction.

8. A production method according to claim 7, characterised in that it includes a step of automatic recognition of the direction of movement of the machine (2) along the arch axis (28) and/or the auxiliary guidance line (38).

9. A production method according to claim 1, characterised in that at least two successive passes are provided, in elevation, an initial auxiliary guidance line, relating to an initial pass, then being translated by predetermined value in order to define a subsequent auxiliary guidance line, relating to a following pass.

10. A production method according to claim 1, characterised in that the frequency (F) of measurement, processing and calculation is defined, between the instant (N) and a following instant (N+1) of subsequent measurement, by a clock in the global positioning system, and is for example around 1 hertz.

11. A production method according to claim 1, characterised in that, if the deviation (E(N)) is determined in an external analysis band (33, 36), then the slaving reference (C(P)) is of constant value, for example its absolute value corresponds to a tool movement distance of around 10 millimetres.

12. A production method according to claim 1, characterised in that, if the deviation (E(N)) is determined in a median analysis band (32, 35), then a so-called median difference or quantity (D) is calculated, defined by a difference between this deviation (E(N)) and a respective delimiter of this band (32, 35) closest to the zero deviation (E0), a slaving reference (C(P)) being derived from this quantity (D).

13. A production method according to claim 12, characterised in that, if the absolute value of the quantity (D) is greater than a maximum median action value (C1), then the absolute value of the reference (C(P)) is determined as being substantially equal to this value (C1), for example this value corresponds to a movement distance of the tool (4) of around 10 millimetres.

14. A production method according to claim 12, characterised in that, if the absolute value of the quantity (D) is less than a minimum median action value (C2), then the absolute value of the reference (C(P)) is determined as being substantially equal to this value (C2), for example this value corresponds to a movement distance of the tool (4) of around 4 millimetres.

15. A production method according to claim 12, characterised in that, if the absolute value of the quantity (D) is between maximum (C1) and minimum (C2) median values, then the absolute value of the reference (C(P)) is determined as being substantially equal to the absolute value of the quantity (D).

16. A production method according to claim 1, characterised in that, if the deviation (E(N)) is determined as being in a centre analysis band (31, 34), for example upper or lower, then there is performed a step of calculating a so-called centre difference (D') between the absolute value of this deviation and the absolute value of a deviation at a previous instant (N−1) of calculation before the instant (N) according to the value of the processing frequency (F)22.

17. A production method according to claim 16, characterised in that, if the difference (D') is negative or zero, then the reference (C(P)) is chosen so as to be substantially zero, and for example the elevation distance of bringing the tool (4) closer is zero.

18. A production method according to claim 16, characterised in that, if the difference (D') is positive, then there is calculated a so-called centre quantity (Q'), equal to a fraction of the difference (D'), for example around one third of this difference.

19. A production method according to claim 18, characterised in that, if the centre quantity (Q') is greater than a maximum centre value (C3), then the absolute value of the reference (C(P)) is determined as being substantially equal to this value (C3), for example this value corresponds to a movement distance of the tool (4) of around 4 millimetres.

20. A production method according to claim 18, characterised in that, if the centre quantity (Q') is less than a minimum centre action value (C4), then the absolute value of the reference (C(P)) is determined as being substantially equal to this value (C4), for example this value corresponds to a movement distance of the tool (4) of around 1 millimetre.

21. A production method according to claim 18, characterised in that, if the centre quantity (Q') is between the minimum (C4) and maximum (C3) centre action values, then the absolute value of the reference (C(P)) is determined as being substantially equal to this centre quantity (Q').

22. A production method according to claim 1, characterised in that a regression curve (37), for example right-hand, is calculated, which defines the mean change in the deviations derived during a predetermined interval of time, for example between times of a prior measurement (N−50) and a preceding measurement (N−1), a regression deviation (E' (N)) being extrapolated at instant (N) from this regression curve (37), and the reference (C(P)) corresponding to the deviation (E(N)) then being corrected as a function of the difference between the extrapolated deviation (E' (N)) and the deviation (E(N)).

23. A production method according to claim 22, characterised in that the correction applied to the reference (C(P)) makes provision for replacing, in the calculation of this reference, on the one hand the value of the deviation (E(N)) with the value of a corrected deviation (E" (N)), and on the other hand the value of the previous deviation (E(N−1)) with the value of a preceding corrected deviation (E"N−1)), the values of the corrected deviation (E" (N)) and the preceding corrected deviation (E" (N−1)) being equal respectively to a weighted mean of the value of the deviation (E(N)) and of the corresponding extrapolated deviation (E' (N)), and to a weighted mean of the value of the preceding deviation (E(N−1)) and a corresponding preceding extrapolated deviation (E' (N−1)).

24. A production method according to claim 1, characterised in that signals or frames received from the receivers (10, 10A, 10B) for processing, undergo decoding and filtering operations, these operations making it possible to transform the frames into digital signals able to be processed, and to eliminate all the measurements whose deviation with respect to a preceding measurement is greater than a predetermined high value, for example around 100 mm.

25. A method according to claim 1, characterised in that a digitisation step, provided by a digitisation module (19), includes notably the phases of:

digitising data relating to the theoretical model (6) for example issuing from a computer aided design;

simulating the movement of the machine (2) on the theoretical model (6), in order to check the consistency of the data;

display of parameters of the theoretical model (6); and creating computer files able to be processed by a computer (18) controlling the method.

26. A production method according to claim 1, characterised in that the theoretical model (6) is notably defined by the arch axis (28) and at least one cross-sectional profile, a step being provided for calculating (18) by linear interpolation between different cross-sectional profile parameters of the theoretical model (6), along this arch axis (28).

27. A production method according to claim 1, characterised in that there is provided an automatic step of identification of error in the limited convergence and/or the processing, such as at least an absence of position measurement by the receiver (10, 10A, 10B), a failure in communication, an error in digitisation of the theoretical model (6), an error in transmitting the global positioning information to a computer (18), a slaving calculation error, or a positioning error peculiar to the machine (2).

28. A production method according to claim 1, characterised in that it provides for the use of at least a second receiver (10; 10A; 10B) and/or at least one attitude sensor, for example an inclinometer or a camber sensor.

29. A production method according to claim 1, characterised in that it provides for three distinct operating modes, a so-called mode of priority to the left of the tool (4), a so-called mode of priority to the right of the tool (4), and a mode without priority, notably for producing cross-sectional profiles (29), broken or the like, of the useful form (7).

30. A control and slaving device (24) intended for the production, according to a theoretical model (6), of a projected form (7) from a body (5) delimited by a three-dimensional envelope, able to implement the method according to claim 1, characterised in that it comprises notably at least:

a positioning module (17);

a computer (18) able to process information coming from the positioning module (17) and a useful part only of the theoretical model (6), accessible for example by means of a file;

a digitisation module (19);

an automatic controller (20), for example programmable; and elevation distributors (21, 22) respectively right, left and tool direction (23).

31. A device (24) according to claim 30, characterised in that the computer (18) comprises notably at least three subsystems, namely:

a decoding and filtering kernel (25);

a location kernel (26); and slaving means (27) connected to the elevation (21, 22) and direction (23) control valves of the tool (4) by means of the automatic controller (20).

32. A device (24) according to claim 31, characterised in that a decoding and filtering kernel (25) and a location kernel

(26) contain digital calculation computer programs, applications issuing from digital calculation software or the like.

33. A device (24) according to claim 30, characterised in that it comprises means of transmitting to the computer (18) at each instant (N) information in the form of coded messages, notably relating to a longitudinal (x) transverse (y) and elevation (z) position of each mobile receiver (10, 10A, 10B).

34. A device (24) according to claim 30, characterised in that it has safety means, able to detect or identify a stoppage of functioning of the mobile receivers (10, 10A, 10B) and/or able to cause this device (24) to switch from an automatic functioning mode to a manual functioning mode according to which a driver (3) of the machine (2) fully controls the latter.

35. A device (24) according to claim 30, characterised in that it comprises means for the automatic recognition of the direction of travel of the machine (2) along the arch axis (28) and/or an auxiliary guidance line (38) of the theoretical model (6).

36. A machine (2) able to implement the method according to claim 1, such as an earthworks grader, a filler tipping skip, a continuous concrete pouring machine, a nibbler for an existing structure, a snow plough or the like, characterised in that it has at least one tool (4) with at least one global positioning receiver (10; 10A; 10B), for example two receivers, mounted on respective masts (8; 8A; 8B) close to the transverse ends of the tool (4).

37. A machine (2) able to implement the method according to claim 1, such as an earthworks grader, a filler tipping skip, a continuous concrete pouring machine, a nibbler for an existing structure, a snow plough or the like, characterised in that it has at least one tool (4) and at least one global positioning receiver (10;10A; 10B) for example close to the transverse ends of the tool (4) and at least one attitude sensor.

38. A machine (2) according to claim 36, characterised in that there is provided, for example in a cab (46) for a driver (3) of this machine (2), display means (47, 48, 49) such as at least one screen, for example of the liquid crystal or similar type.

39. A machine (2) according to claim 38, characterised in that the display means include at least one welcoming and parameterising screen (47), a working screen (48) and a geometric information screen (49), the welcoming and parameterising screen (47) being for example of the touch type to enable a driver (3) of the vehicle to initialise a control and slaving device (24).

40. A machine (2) according to claim 36, characterised in that it has automatic means for the slaving of its direction, for example controlled by a control and slaving device (24), these direction slaving means being able to automatically make a movement path of the machine (2) converge towards and along an auxiliary guidance line (38).

41. A machine (2) according to claim 36, characterised in that it has means of adjusting the transverse position of the tool (4) about an elevation direction, able to allow the limited convergence of the path of this tool (4) towards and along an auxiliary guidance line (38).

42. A machine (2) according to claim 36, characterised in that it has a steering lever (45) and means of determining the priority of an automatic mode, this determination making it possible, by a movement of this lever (45) operated by a driver (3), to make the functioning of a control and slaving device (24) change from an automatic mode to a manual mode.

43. A useful form (7) obtained from a body (5), characterised in that it is produced according to the method of claim 1, the differences in elevation in the useful form (7) along the arch axis (28) of the theoretical model (6) being between −13 mm and +13 mm at the most, compared with the model (6), on each side in elevation.

44. A machine (2) having at least one device (24) according to claim 30, such as an earthworks grader, a filler tipping skip, a continuous concrete pouring machine, a nibbler for an existing structure, a snow plough or the like, characterised in that it has at least one tool (4) and at least one global positioning receiver (10;10A; 10B) for example close to the transverse ends of the tool (4) and at least one attitude sensor.

45. A machine (2) having at least one device (24) according to claim 30, such as an earthworks grader, a filler tipping skip, a continuous concrete pouring machine, a nibbler for an existing structure, a snow plough or the like, characterised in that it has at least one tool (4) with at least one global positioning receiver (10; 10A; 10B), for example two receivers, mounted on respective masts (8; 8A; 8B) close to the transverse ends of the tool (4).

46. A useful form (7) obtained from a body (5), characterised in that it is produced by means of at least one control and slaving device (24) according to one of claim 30, the differences in elevation in the useful form (7) along the arch axis (28) of the theoretical model (6) being between −13 mm and +13 mm at the most, compared with the model (6), on each side in elevation.

47. A useful form (7) obtained from a body (5), characterised in that it is produced with at least one site machine (2) according to claim 36, the differences in elevation in the useful form (7) along the arch axis (28) of the theoretical model (6) being between −13 mm and +13 mm at the most, compared with the model (6), on each side in elevation.

* * * * *